United States Patent [19]

Kamelmacher

[11] Patent Number: 4,564,480
[45] Date of Patent: Jan. 14, 1986

[54] AERATION SYSTEM AND METHOD

[76] Inventor: Eduard Kamelmacher, 77 Lionel Rd., Brentford, Middlesex, England

[21] Appl. No.: 182,674

[22] Filed: Aug. 29, 1980

Related U.S. Application Data

[63] Continuation of Ser. No. 971,250, Dec. 20, 1978, abandoned, which is a continuation of Ser. No. 796,166, May 12, 1977, abandoned.

[51] Int. Cl.$^4$ ................................................ B01F 3/04
[52] U.S. Cl. .......................... 261/36 R; 261/DIG. 75
[58] Field of Search .............. 261/36 R, 77, DIG. 75, 261/121 R, 123; 216/220, 221.1, 221.3, 758, 765

[56] References Cited

U.S. PATENT DOCUMENTS

| | | | |
|---|---|---|---|
| 1,808,956 | 6/1931 | Ketterer | 261/77 |
| 2,128,311 | 8/1938 | Mertes | 261/DIG. 75 |
| 2,719,032 | 9/1955 | Schnur | 261/123 |
| 3,271,304 | 9/1966 | Valdespino et al. | 261/77 |
| 3,587,976 | 6/1971 | Jacuzzi | 261/77 |
| 3,677,525 | 7/1972 | Schurig et al. | 261/77 |
| 3,710,549 | 1/1973 | Nichols et al. | 261/DIG. 75 |
| 3,732,668 | 5/1973 | Nichols | 261/77 |
| 3,788,040 | 1/1974 | Bragg et al. | 261/77 |
| 3,927,152 | 12/1975 | Kyrias | 261/124 |

FOREIGN PATENT DOCUMENTS

| | | | |
|---|---|---|---|
| 208788 | 4/1960 | Austria | 261/77 |
| 2059415 | 6/1971 | Fed. Rep. of Germany | 261/77 |
| 1377571 | 9/1964 | France | 261/77 |
| 2238525 | 2/1975 | France | 261/36 R |
| 2355554 | 1/1978 | France | 261/77 |
| 2360340 | 3/1978 | France | 261/77 |
| 111720 | 12/1917 | United Kingdom | 261/77 |
| 1294466 | 10/1922 | United Kingdom | 261/77 |
| 1163780 | 9/1969 | United Kingdom | 261/77 |

OTHER PUBLICATIONS

Thompson et al., "Shipboard Waste Treatment", Published in Water Pollution Control, 1973, pp. 545–549.

*Primary Examiner*—Tim Miles
*Attorney, Agent, or Firm*—Staas & Halsey

[57] ABSTRACT

A liquid treatment plant employing a gas - liquid mass transfer process includes a circulating pump for a liquid within a tank, and an injector pump which operates to entrain air in the liquid delivered by the circulating pump prior to return of the liquid/air mixture to the tank by way of a mixing pipe and a deflector which disperses the mixture. The cross-section area of the injector pump outlet is between 1.05 and 1.4 times that of the injector pump nozzle, and the cross-sectional area of the mixing pipe is between 4 and 11 times that of the injector pump nozzle.

16 Claims, 2 Drawing Figures

AERATION SYSTEM AND METHOD

This is a continuation of application Ser. No. 971,250 filed Dec. 20, 1978 Abn. which in turn in a continuation of application Ser. No. 796,166 filed May 12, 1977 Abn.

BACKGROUND AND SUMMARY OF THE INVENTION

This invention relates to liquid treatment plants and methods for their operation.

It is known to use a variety of plants for two-phase gasliquid mass transfer processes, for example in the biological clarification of waste water by the introduction of atmospheric oxygen.

One type of plant employs rotating impellers whose suction parts are installed just below the liquid surface, and which increase the interphase area by creating drops of liquid which are impelled through the gas phase. Other types of plant create bubbles of gas in the liquid, and increase the interphase area by pumping a compressed gas into the liquid through various types of diffusor (e.g. baffled columns etc., porous tiles, perforated pipes etc.).

The performance of the mass transfer process is controlled in the main by two parameters, others being equal: residence time and interphase area.

With the compressed gas processes the residence time can be increased by increasing the depth of immersion of the diffusor in the liquid. The interphase area can be increased by decreasing the size of the pores or holes in the diffusors. Either expedient, however, increases the power consumption in greater proportion than the rate of mass transfer, therefore the efficiency of the process is not improved. A further disadvantage of decreasing the size of the pores or holes in the diffusors is the increased danger of blocking by foreign bodies.

It is an object of the invention to provide an apparatus of simple construction, which increases the residence time and the interphase area in greater proportion than the increase in power consumption.

According to one aspect of the invention a liquid treatment plant for a two-phase, gas-liquid mass transfer process comprises a tank for containing a liquid so as to provide a gas volume above the liquid surface, a circulating pump for withdrawing liquid from said tank, a liquid injector pump downstream of said circulating pump, said injector pump having a nozzle opening through which liquid from said circulating pump can pass, an inlet through which gas can be drawn as a result of passage of liquid through said nozzle opening, and an outlet spaced axially from said nozzle opening, a mixing pipe extending from said outlet to a position adjacent the bottom of said tank, and a deflector for urging a gas-liquid stream within said mixing pipe in a direction transverse to the axis thereof, the cross-sectional area of a portion of said injector pump outlet adjacent said nozzle opening being between 1.05 and 1.4 times the cross-sectional area of said nozzle opening, and the cross-sectional area of said mixing pipe being between 4 and 11 times the cross-sectional area of said nozzle opening.

According to another aspect of the invention a method of operating a plant as above defined comprises maintaining the delivery head of said delivery pump at between 17% and 30% of the depth of the bottom of said mixing pipe below the surface of a liquid in the tank.

It is to be understood that the term delivery head relates to the heigh to which the circulating pump will deliver a liquid.

According to a further aspect of the invention a method of operating a plant as above defined comprises maintaining the delivery head of said circulating pump at between 0.7 and 1.4 meters of the liquid being pumped.

According to yet another aspect of the invention a method of operating a plant as above defined comprises maintaining a liquid level in said tank such that said level is not more than 10 diameters of said nozzle opening above, or more than 20 diameters of said nozzle opening below, the centre of said nozzle opening.

An example of the invention will now be described with reference to the accompanying drawings, in which:

DESCRIPTION OF THE PREFERRED EMBODIMENT

Figure 1:
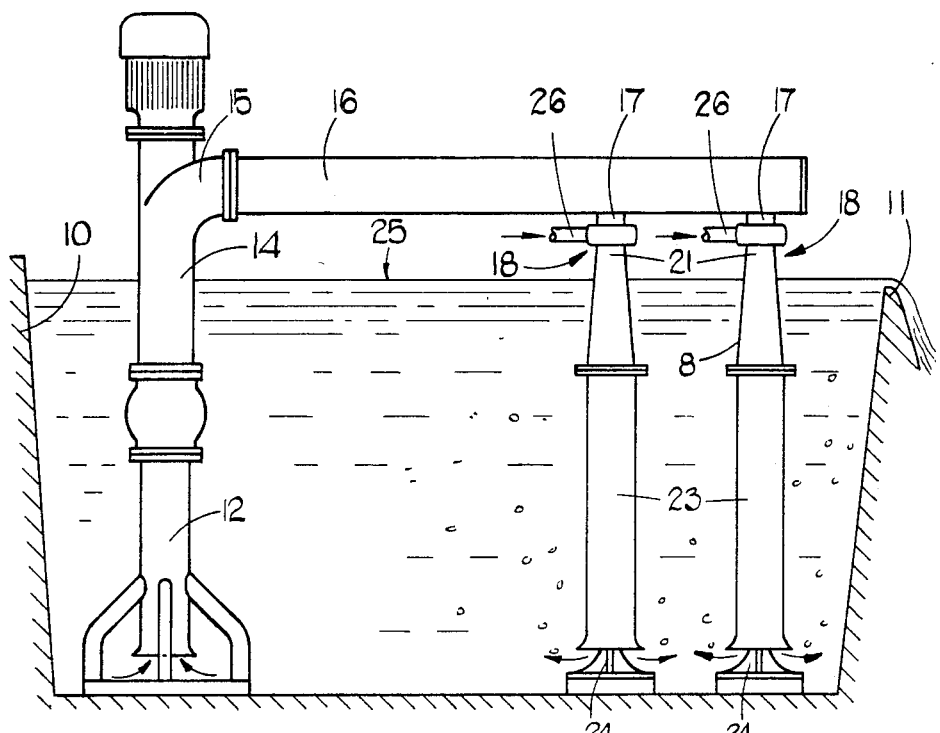
FIG. 1 shows a section through a liquid treatment plant.

In FIG. 1 a tank 10 has an open top and is of generally trapezoidal section. The tank 10 is provided with a weir 11 so that, in use, a liquid within the tank 10 is maintained at constant level. Within the tank 10 is a support foot and intake stand pipe 12 leading to a low-head centrifugal pump 14. A delivery pipe 15 from the pump 14 is connected by way of a manifold 16 to the nozzles 17 of a plurality of liquid injector pumps 18.

Figure 2:
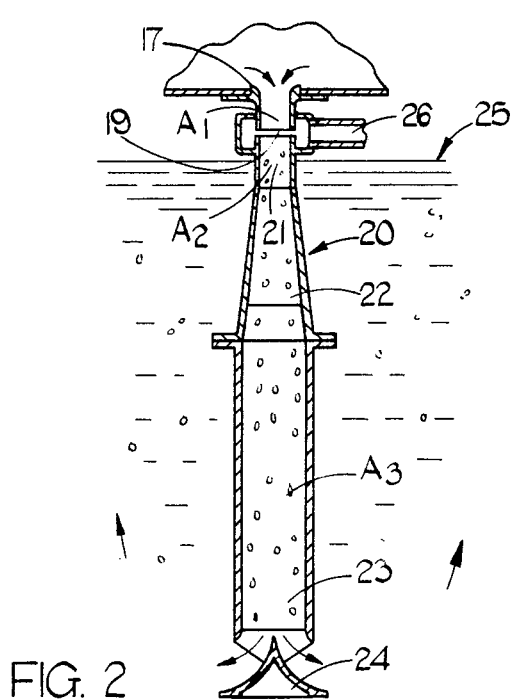
FIG. 2 is a section through an injector pump and mixing passage forming part of FIG. 1.

One of the injector pumps 18 is shown in more detail in FIG. 2 and includes a circular nozzle opening 19, which is axially aligned with, and spaced from, an outlet 20 of the injector pump. The outlet 20 comprises a cylindrical mixing chamber portion 21 adjacent the nozzle opening 19, and a diffuser portion 22 which may be frusto-conical. The cross-sectional area A2 of the mixing chamber portion 21 is between 1.05 and 1.4 times the cross-sectional area A1 of the nozzle opening 19. In a preferred embodiment, however, the ratio of the area A2 to area A1 is 1.2.

In alternative embodiments the cross-section of the mixing chamber portion 21 is not circular and/or does not have a constant cross-section. In such embodiments the minimum cross-sectional area of the portion 21 is construed as the area A2 and is, as indicated above, between 1.05 and 1.4 times the area A1, or preferably is 1.2 times the area A1.

A gas inlet 26 for the injector pump 18 communicates with the gap between the nozzle opening 19 and the mixing chamber portion 21, so that passage of liquid through the nozzle opening causes gas to be drawn, in a known manner, through the inlet 26 and entrained in the liquid passing to the outlet 20.

Axially aligned with the outlet 20, and connected thereto, is a vertical mixing pipe 23, which extends to a position adjacent the bottom of the tank 10. The cross-sectional area A3 of the bore of mixing pipe 23 is between 4 and 11 times the area A1 of the nozzle opening 19. In preferred embodiments the area A3 is between 6 and 9 times the area A1.

In a further preferred embodiment the area A3 is 7.4 times the area A1.

A deflector 24 is aligned with the mixing pipe 23 so as to urge a gas-liquid flow within the tube 23 radially horizontally along the tank bottom.

In the arrangement shown the nozzle openings 19 lie in substantially horizontal planes. These planes are positioned, relative to the weir 11, so that the centres of the nozzle openings 19 lie not more than twenty nozzle-opening diameters above, or more than ten nozzle-opening diameters below, the surface 25 of the liquid whose level is determined by the weir 11.

In a preferred embodiment the centres of the nozzle openings 19 are one nozzle-opening diameters above the surface 25.

In the example shown the axis of the nozzle opening 19, the mixing chamber portion 21 and the diffuser portion 22 are vertically axially aligned with the mixer pipe 23.

In alternative arrangements the mixing chamber portion 21 may be connected to the mixer pipe 23 by means of an elbowed diffuser portion 22, whereby the aligned axes of the nozzle opening 19 and the mixing chamber portion 21 are inclined to the vertical. These latter axes may in some embodiments be horizontal. It will be understood, nevertheless, that the centres of the nozzle openings 19 may be positioned relative to the liquid surface 25, so as to comply with the general or the preferred limitations indicated above.

In use, operation of the pump 14 delivers liquid to the injector pumps 18, where the gas is introduced into the liquid. The velocity of the liquid flow through the nozzle openings 19 causes intimate mixing of the gas and liquid within the mixing chamber portions 21. In the diffuser portions 22 the kinetic energy of the gas-liquid mixture is converted into potential energy. The mixture is urged through the mixer pipes 23 to re-enter the tank 10. Bubbles from the mixture then rise upwards to the liquid surface 25.

In operation the delivery head of the pump 14 is maintained between 0.7 meters and 1.4 meters of the liquid being pumped. In a preferred method of operation, however, the pump delivery head is maintained at 1 meter of the pumped liquid. In an alternative method of operation the delivery head of the pump 14 is maintained at not less than 17%, and not more than 30% of the depth of immersion of the open end of the mixer pipes 23 in the liquid.

In an alternative method of operation the head of the pump 14 is maintained at between 1/1.5 and 1/10 of the length of the pipe 23 and is preferably 1/6 of the length of the pipe 23.

An advantage of the apparatus and methods according to the invention is that the power required for delivery of the gas-liquid mixture from the mixer pipes 23 is, for a given residence time, less than that of existing apparatus.

Thus, in the present invention, a power input of the same order as that of known compressed gas mass transfer plants will result in an increased residence time, and hence an improved mass transfer performance.

It has been found that apparatus and methods according to the invention can effect a residence time of 1.7 times that obtainable by known apparatus and methods with the same power consumption.

The apparatus and method thus result in an improved efficiency in mass-transfer processes.

The apparatus is of simple construction, having only a single moving part namely the rotor of the pump 14. The circulation system consists of wide pipes which are not susceptible to blocking. The apparatus can function independently of climate, especially in winter conditions for even if the liquid surface 25, 10 is convered with ice, provided a few holes are broken in the ice for the escape of surplus gas and the gas inlets 26 are kept clear the apparatus will continue to operate. The apparatus lends itself readily to construction from the cheapest of materials, namely concrete, plastics, cement-asbestos etc. By the provision of a suitable number of pumps 14 and liquid injectors 18 the apparatus can be adapted to any size of tank.

I claim:

1. A liquid treatment plant for a two-phase, gas-liquid mass transfer process, comprising a tank for containing a liquid so as to provide a gas volume above the liquid surface, means for maintaining said liquid at a predetermined level in said tank, a circulating pump for withdrawing liquid from said tank, a liquid injector pump downstream of said circulating pump, said injector pump having a nozzle opening through which liquid from said circulating pump can pass, an outlet spaced axially a small distance from said nozzle opening, and an inlet passage communicating with the space between said nozzle and said outlet, said inlet passage providing means through which only gas can be drawn as a result of passage of liquid through said nozzle opening to said outlet, a substantially vertical mixing pipe communicating with said outlet and extending from adjacent said predetermined level to a position adjacent the bottom of the tank, and a deflector for urging a gas-liquid stream emerging from said mixing pipe in a direction transverse to the axis thereof, a portion of said injector pump outlet adjacent said nozzle opening having a cross-sectional area of between 1.05 and 1.4 times the cross-sectional area of said nozzle opening, and the cross-sectional area of said mixing pipe being between 4 and 11 times the cross-sectional area of said nozzle opening.

2. A plant as claimed in claim 1 in which said cross-sectional area of said injector pump outlet portion is defined by the minimum cross-sectional area of said portion.

3. A plant as claimed in claim 1 in which the cross-sectional area of said mixing pipe is between 6 and 9 times the cross-sectional area of said nozzle opening.

4. A plant as claimed in claim 3 in which the cross-sectional area of said mixing pipe is 7.4 times the cross-sectional area of said nozzle opening.

5. A plant as claimed in claim 1 in which the cross-sectional area of said injector pump outlet portion is 1.2 times that of said nozzle opening.

6. A plant as claimed in claim 1 wherein said means for maintaining liquid at a predetermined level in said tank comprises means for maintaining the centre of said nozzle opening at not more than 20 nozzle-opening diameters above, or more than 10 nozzle-opening diameters below, the level determined by said liquid level maintaining means.

7. A plant as claimed in claim 6 which includes means for maintaining the centre of said nozzle opening at one nozzle diameter above said predetermined level.

8. A liquid treatment plant for a two-phase, gas-liquid mass transfer process, comprising a tank for containing a liquid so as to provide a gas volume above the liquid surface, means for maintaining said liquid at a predetermined level in said tank, a circulating pump for withdrawing liquid from said tank, a liquid injector pump downstream of said circulating pump and adjacent said predetermined liquid level, said injector pump having a single nozzle opening through which only liquid from said circulating pump can pass, and an outlet spaced axially a small distance from said nozzle opening, said spacing providing an inlet through which only gas can be drawn as a result of passage of liquid through said nozzle opening and into said outlet, a substantially vertical mixing pipe extending from adjacent said predetermined level to a position adjacent the bottom of said tank, and a deflector for urging a gas-liquid stream emerging from said mixing pipe in a direction transverse to the axis thereof, a portion of said injector pump outlet adjacent said nozzle opening having a cross-sectional area of between 1.05 and 1.4 times the cross-sectional area of said nozzle opening, and the cross-sectional area of said mixing pipe being between 4 and 11 times the cross-sectional area of said nozzle opening.

9. A plant as claimed in claim 8 in which said outlet includes a diffuser portion which is divergent in the direction of flow of gas and liquid through said outlet.

10. A method of operating a liquid treatment plant for a two-phase, gas-liquid mass transfer process, comprising maintaining said liquid at a predetermined level in a tank so as to provide a gas volume above said liquid surface, withdrawing liquid from said tank by means of a circulating pump, passing the liquid discharged by said circulating pump through the nozzle of an injector pump having an outlet axially spaced from said nozzle and also having an inlet passage communicating with the nozzle-outlet spacing and through which only gas can be drawn as a result of passage of said liquid through said nozzle to said outlet, passing the combined liquid and gas successively through said outlet and through a substantially vertical mixing pipe which communicates with said outlet and extends from adjacent said predetermined level to adjacent said tank bottom, deflecting the gas-liquid stream emerging from said mixing pipe in a direction transverse to the axis thereof, the injector pump outlet having a cross-sectional area of between 1.05 and 1.4 times the cross-sectional area of the nozzle thereof, and the cross-sectional area of said mixing pipe being between 4 and 11 times the cross-sectional area of said nozzle, and maintaining the delivery head of said circulating pump at between 17% and 30% of the depth of the bottom of said mixing pipe below the surface of said liquid.

11. A method as claimed in claim 10 which includes maintaining the liquid level not more than ten nozzle-opening diameters above, or more than twenty nozzle-opening diameters below, the centre of said nozzle opening.

12. A method as claimed in claim 11 in which said liquid level is maintained at one nozzle-opening diameter below the centre of said nozzle opening.

13. A method of operating a liquid treatment plant for a two-phase, gas-liquid mass transfer process, comprising maintaining said liquid at a predetermined level in a tank so as to provide a gas volume above said liquid surface, withdrawing liquid from said tank by means of a circulating pump, passing the liquid discharged by said circulating pump through the nozzle of an injector pump having an outlet axially spaced from said nozzle and also having an inlet passage communicating with the nozzle-outlet spacing and through which only gas can be drawn as a result of passage of said liquid through said nozzle to said outlet, passing the combined liquid and gas successively through said outlet and through a substantially vertical mixing pipe which communicates with said outlet and extends from adjacent said predetermined level to adjacent said tank bottom, deflecting the gas-liquid stream emerging from said mixing pipe in a direction transverse to the axis thereof, the injector pump outlet having a cross-sectional area of between 1.05 and 1.4 times the cross-sectional area of the nozzle thereof, and the cross-sectional area of said mixing pipe being between 4 and 11 times the cross-sectional area of said nozzle, and maintaining the delivery head of said circulating pump at between 0.7 and 1.4 meters of the liquid being pumped.

14. A method as claimed in claim 13 in which the delivery head of said circulating pump is maintained at 1 meter of the liquid being pumped.

15. A method of operating a liquid treatment plant for a two-phase, gas-liquid mass transfer process, comprising maintaining said liquid at a predetermined level in a tank so as to provide a gas volume above said liquid surface, withdrawing liquid from said tank by means of a circulating pump, passing the liquid discharged by said circulating pump through the nozzle of an injector pump having an outlet axially spaced from said nozzle and also having an inlet passage communicating with the nozzle-outlet spacing and through which only gas can be drawn as a result of passage of said liquid through said nozzle to said outlet, passing the combined liquid and gas successively through said outlet and through a substantially vertical mixing pipe which communicates with said outlet and extends from adjacent said predetermined level to adjacent said tank bottom, deflecting the gas-liquid stream emerging from said mixing pipe in a direction transverse to the axis thereof, the injector pump outlet having a cross-sectional area of between 1.05 and 1.4 times the cross-sectional area of the nozzle thereof, and the cross-sectional area of said mixing pipe being between 4 and 11 times the cross-sectional area of said nozzle, and maintaining the delivery head of said circulating pump at between 1/1.5 and 1/10 of the length of said mixing pipe.

16. A method as claimed in claim 15 in which said pump delivery head is maintained at one sixth of the length of said mixing pipe.

* * * * *